United States Patent [19]

Yaker

[11] Patent Number: 5,675,627
[45] Date of Patent: Oct. 7, 1997

[54] INTEGRATED PAGER AND CALLING CARD

[75] Inventor: Rhoda Yaker, Annandale, N.J.

[73] Assignee: Lucent Technologies Inc., Murray Hill, N.J.

[21] Appl. No.: 346,061

[22] Filed: Nov. 29, 1994

[51] Int. Cl.$^6$ .................................................. H04Q 7/14
[52] U.S. Cl. ........................... 379/57; 379/144; 379/357; 340/825.44
[58] Field of Search .................... 379/57, 144, 357; 340/825.44; 235/380

[56] References Cited

U.S. PATENT DOCUMENTS

| | | | |
|---|---|---|---|
| 4,346,401 | 8/1982 | Delianides et al. | 439/67 |
| 4,677,657 | 6/1987 | Nagata et al. | 379/357 |
| 4,680,785 | 7/1987 | Akiyama et al. | 379/57 |
| 4,795,898 | 1/1989 | Bernstein et al. | 235/487 |
| 4,798,322 | 1/1989 | Bernstein et al. | 235/487 |
| 4,816,654 | 3/1989 | Anderl et al. | 235/380 |
| 5,192,947 | 3/1993 | Neustein | 340/825.44 |
| 5,212,721 | 5/1993 | DeLuca et al. | 379/57 |
| 5,250,870 | 10/1993 | Fenlon et al. | 310/345 |
| 5,263,195 | 11/1993 | Panther et al. | 455/316 |
| 5,272,475 | 12/1993 | Eaton et al. | 340/825.44 |
| 5,307,508 | 4/1994 | Rollins et al. | 455/38.1 |

*Primary Examiner*—Dwayne D. Bost
*Attorney, Agent, or Firm*—John C. Moran

[57] ABSTRACT

The functions of a paging device and the calling card or any other type of credit card having integrated into one unit which is referred to as a smartcard and has approximately the dimensions of a standard credit card. The smartcard not only receives the number of the caller from the paging center but automatically dials and transmits billing information when inserted into a pay telephone. The user can through the use of switches on the smartcard return all of the calls for the telephone numbers that were received from the paging service. In addition, the smartcard allows for the storage of commonly-dialed numbers used by the user that can also be automatically dialed when the smartcard is inserted into a pay telephone. Also, if the name of the caller is transmitted rather than the telephone number from the paging center, the smartcard searches the commonly-dialed numbers to find the telephone number associated with that name.

14 Claims, 9 Drawing Sheets

INTEGRATED PAGER AND CALLING CARD

TECHNICAL FIELD

The present invention generally relates to paging devices and calling cards and, more particularly to the integration of the functions of a pager into a calling card.

BACKGROUND OF THE INVENTION

Paging devices have been in use for a number of years. A person wishing to contact the user of a pager first calls a paging center using the number assigned to the user. The paging service then allows the person to enter a voice message or a telehone number using the multi-frequency dialing capabilities of a telephone set. In response, the paging center sends a radio frequency message to the pager alerting the user of the pager to the fact that there is a message waiting. In addition, the paging center may also transmit a telephone number entered by the caller. For users of pagers who are traveling, it is necessary then for the user to find a telephone and to dial the number of the caller to set up a telephone conversation. Normally, the user utilizes a pay telephone. The use of a pay telephone then requires money or the entering of the calling card number. The telephone may have the capability of automatically reading the calling card number from the calling card. Nevertheless, the user still must dial the number of the calling party. If the user has received a number of telephone calls which are displayed on the user pager, then the user must write these telephone numbers down and dial each of them individually. In addition, the prior art paging devices are rather large objects which occupy a fair of physical space on the user's body.

U.S. Pat. No. 5,276,729 discloses the technique for use with cellular telephones that eliminates the need for the user of the cellular telephone to have to dial a caller who had called and been transferred to a call coverage system. The user of the cellular telephone calls the call coverage system which downloads the number of the caller into the user's cellular telephone. The cellular telephone then automatically dials the caller and sets up a telephone call between the user and the original caller. U.S. Pat. No. 5,192,947 discloses a pager that is the approximate size of a credit card, and one half of which has a magnetic strip for use as a credit card.

There exists a need for users of paging devices for the capability of being able to automatically dial the received telephone number of the caller and to reduce the bulk of the paging device itself.

SUMMARY OF THE INVENTION

The foregoing needs are met in an illustrative embodiment wherein the functions of a paging device and the calling card or any other type of credit card are integrated into one unit which is referred to as a smartcard and has approximately the dimensions of a standard credit card. Advantageously, the smartcard not only receives the number of the caller but will automatically dial and establish billing information when inserted into a pay telephone. The user can through the use of switches on the smartcard return all of the calls that were received from the paging service. In addition, the smartcard allows for the storage of commonly-dialed numbers used by the user that can also be automatically dialed when the smartcard is inserted into a pay telephone. Also, if the name of the caller is transmitted rather than the telephone number, the smartcard searches the commonly-dialed numbers to find the telephone number associated with that name.

DETAILED DESCRIPTION

Figure 1:
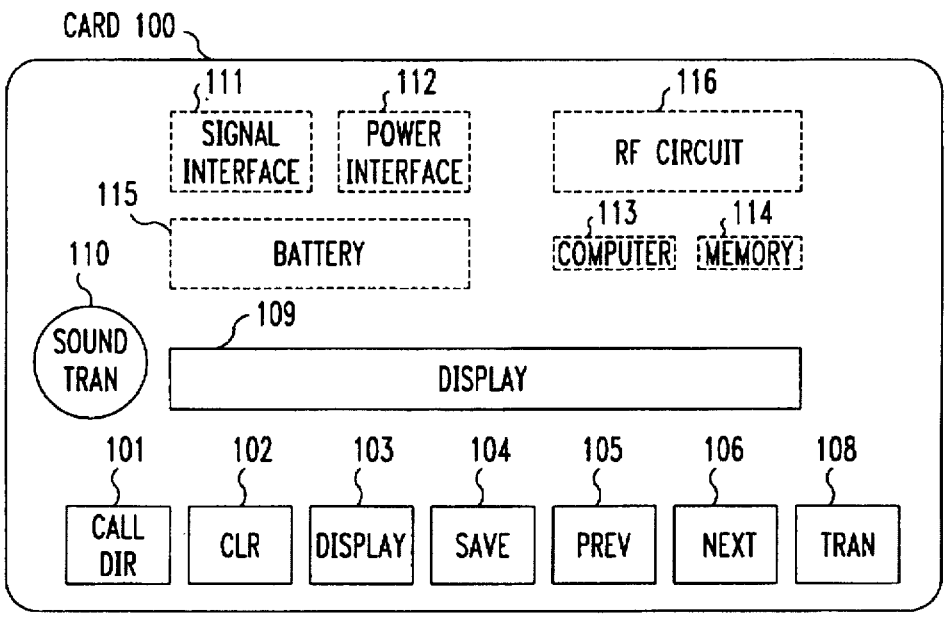
FIG. 1 illustrates a pictorial view of a smartcard which is the subject of this invention.
Figure 2:
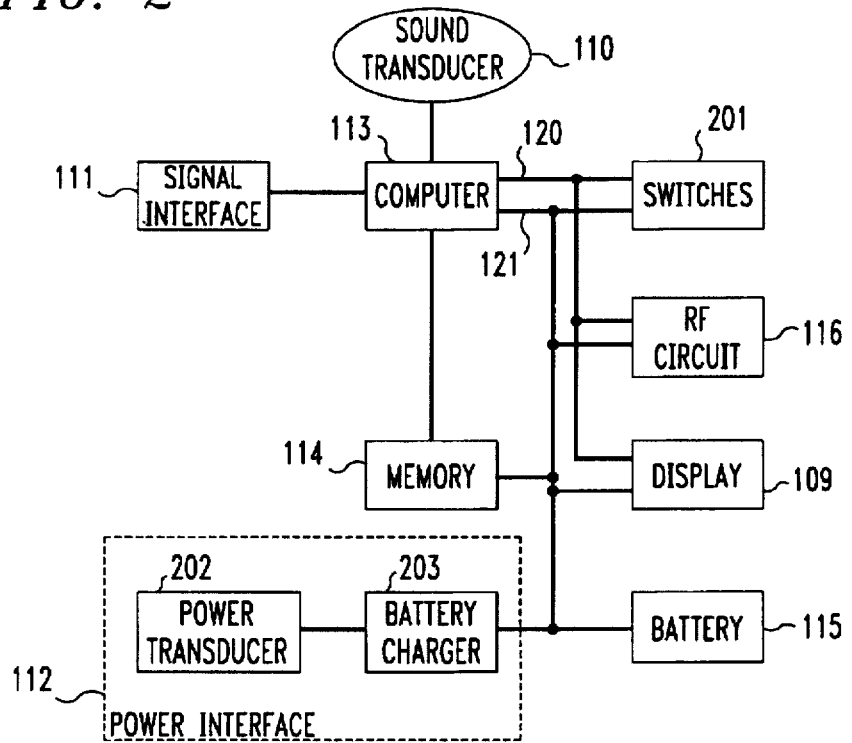
FIG. 2 illustrates, in block diagram form, the smartcard of FIG. 1.

FIG. 1 illustrates a front view of smartcard 100 which is the subject of this invention. Blocks 111 through 115 are illustrated in dash lines to represent the fact that these elements are buried within smartcard 100 itself. Buttons 101 through 108 are utilized to control the smartcard 100. Display 109 is used to display information to the user. FIG. 2 illustrates, in block diagram form, smartcard 100 of FIG. 1. The smartcard receives power via power interface 112 that is shown in greater detail in FIG. 2 and as set forth in U.S. Pat. Nos. 4,797,541 and 4,802,080 which are hereby incorporated by reference. Smartcard 100 communicates signals with outside devices via signal interface 111 using capacitively coupled mechanism as is set forth in U.S. Pat. No. 4,797,898 which is also hereby incorporated by reference. RF circuit 116 provides the radio functions of a pager.

As illustrated in FIG. 2, computer 113 provides overall control for smartcard 100. Power for smartcard 100 is provided by battery 115 which is charged by an external device via power interface 112. The latter interface includes power transducer 202 and battery charger 203. An external device for reading smartcard 100 may be of the type set forth in U.S. Pat. No. 4,798,322 and that device is combined with a personal computer to allow the user to enter their private telephone directory into smartcard 100. A telephone set for use with smartcard 100 is described in U.S. patent application Ser. No. 08/065,847, filed on May 21, 1993, entitled, "Smartcard Telephone Adjunct", is owned by the same assignee as the present application, and is hereby incorporated by reference. The specification of this U.S. Patent Application is reproduced in Appendix A.

Consider first the pager functions of smartcard 100 illustrated in FIG. 2. When a message is transmitted from the paging center, RF circuit 116 receives this message and converts it to digital information which is then transferred to computer 113 via signal bus 121. Computer 113 is responsive to the digital information to determine if the paging message is intended for this pager. If the message is intended for the pager, computer 113 actuates sound transducer 110. Computer 113 deactivates sound transducer 110 upon the clear button 102 being activated. If the message from the paging center includes the calling telephone number, this information is stored in memory 114 and displayed on display 109. If the message is of a information type, i.e., "call home", this message is displayed on display 109 and stored in memory 114. A number of calling numbers can be stored in memory 114 by computer 113 as these calling numbers are received by RF circuit 116. Note, that the textual information messages are also stored in memory 114 so that the user can review these messages at a later point in time. The user of smartcard 100 can return the calls stored in memory 114 by inserting smartcard 100 into a telephone set having a unit capable of reading smartcard 100. The telephone then communicates with computer 113 via signal interface 111 utilizing the method set forth in U.S. Pat. No. 4,816,654. The user then utilizes buttons 105 and 106 to display the calling number in display 109. Once the desired calling number is displayed in display 109, the user activates the transmit button 108. Computer 113 is responsive to this actuation to set up a call to the calling party via the telephone set. If this telephone set is a pay telephone, computer 113 accesses from memory 114 the calling card number and utilizes the calling card number to pay for the telephone call. Once the telephone call has been successfully made and the user does not wish to call the calling party a second time, the calling party activates clear button 102 to clear the calling number from display 109 and most importantly to delete it from memory 114. Save button 104 is used in conjunction with buttons 105 and 106 to change the sequence in which calls are returned. Initially, computer 113 stores the calling numbers in memory 114 in the order in which the calls were received via RF circuit 116. In addition, computer 113 can utilize a credit card number stored in memory 114 to complete the call to the calling party.

Figure 3:
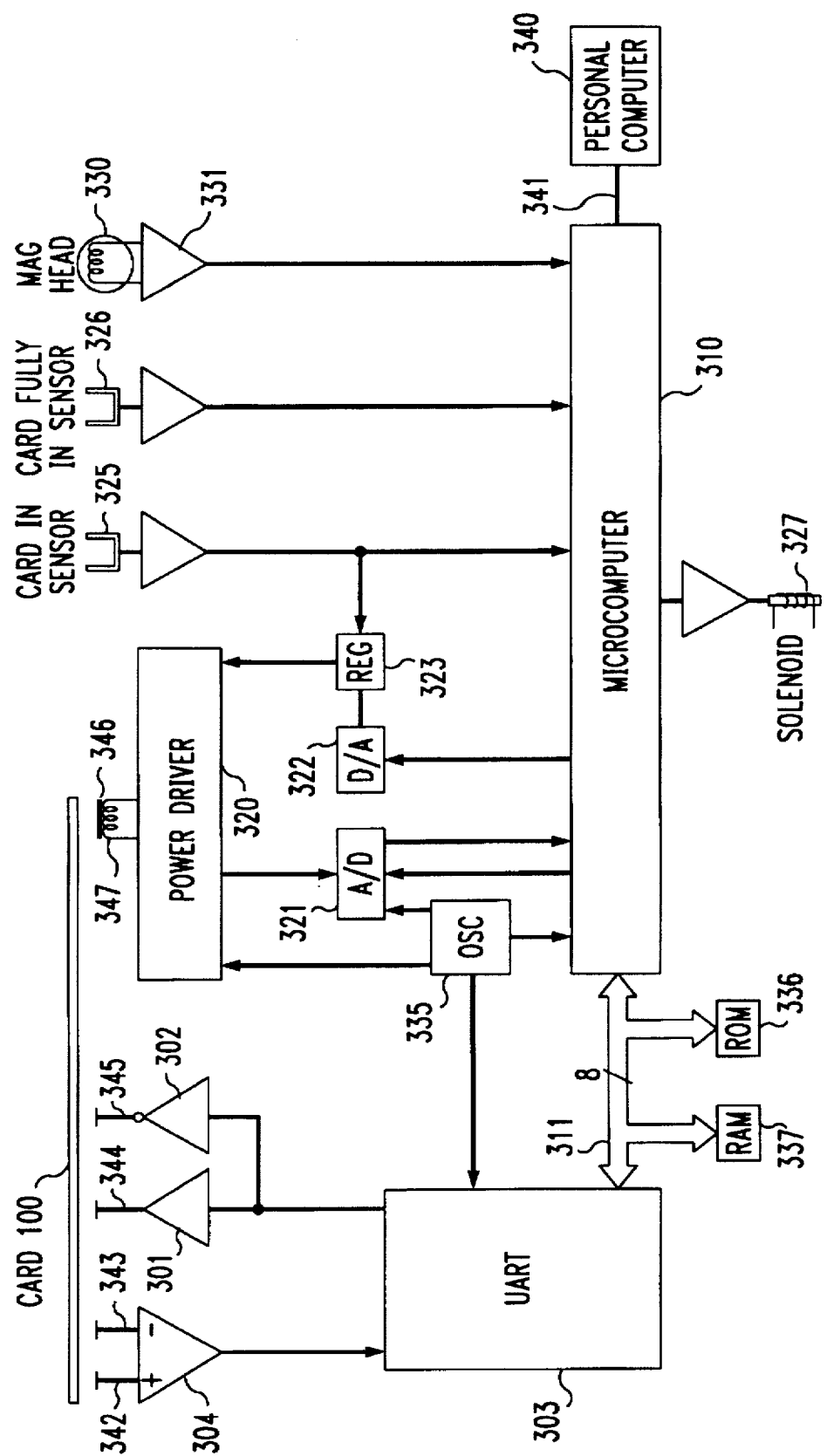
FIG. 3 illustrates, in block diagram form, a personal computer and an apparatus for reading and writing the smartcard of FIG. 1.

Using the apparatus illustrated in FIG. 3, the user of smartcard 100 can also load into memory 114 via computer 113 and signal interface 111 a personal directory of telephone numbers that the user frequently calls. The numbers can be entered with a name plus a telephone number or simply a telephone number. If the information is transmitted to computer 113 as a name plus a telephone number, only the name will be displayed on 109 when the user is accessing the personal telephone directory. To activate the personal telephone directory, the user activates call directory button 101. The user then utilizes previous button 105 and next button 106 to display the desired party in display 109. After this party has been displayed, the user actuates transmit button 108 while the smartcard is being read by a telephone set. Computer 113 then establishes the call to the person or telephone number presently being displayed in display 109. To switch back to the calling numbers received via RF circuit 116, the user actuates call directory 101 a second time.

An additional paging function of smartcard 100 is that when a calling number is received by computer 113 from RF circuit 116, computer 113 examines the personal telephone directory stored in memory 114 to determine if the calling number is in the telephone directory. If the calling number is found in the personal telephone directory, computer 113 stores the textual name from the telephone directory and the calling number in the calling list in memory 114. Thus, when the user of smartcard 100 accesses the calling numbers received by RF circuit 116, smartcard 100 displays the name of the caller rather than just the calling number. In addition, if the textual name is received by RF circuit 116, computer 113 examines the personal telephone directory stored in memory 114 looking for this textual name. If the textual name is found in the personal telephone directory, computer 113 stores the textual name and the calling number in memory 114 for later accessing when the user is responding to calls received via the paging center. Also, computer 113 maintains a time of day clock, and includes the time of day information for each call received from the paging center via RF circuit 116. This time of day is displayed when the user displays the calling party's name or the calling number.

FIG. 3 illustrates the apparatus for writing and reading information to/from smartcard 100. The elements illustrated in FIG. 3 with the exception of personal computer 340 are described in detail in U.S. Pat. No. 4,798,322. The latter patent shows that an application station rather than the personal computer communicating user data with microcomputer 310 and also shows a plurality of individual connectors for the communication of the information between application station 340 and microcomputer 310. In FIG. 3, personal computer 340 utilizes duplex link 341 which is a serial link to communicate information with microcomputer 310 and personal computer 340. Personal computer 340 is programmed to provide a user interface for the storage of the personal telephone directory and also for making modifications to this personal telephone directory stored on smartcard 100. In addition, personal computer 340 can also have computer 113 store credit card numbers and calling card numbers into memory 114 for use in making calls or for the purchasing of merchandise in the traditional manner that credit cards have routinely been used. One skilled in the art readily sees how to program personal computer 340 to perform these tasks.

Figure 4:
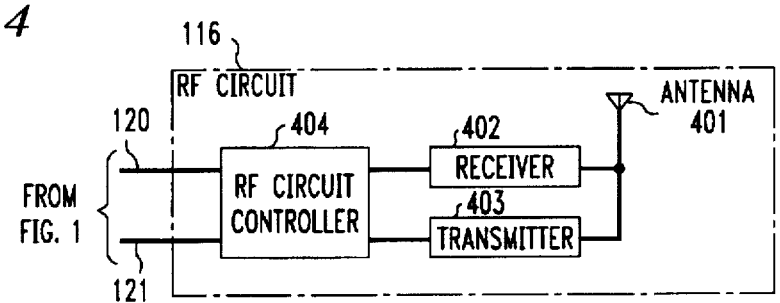
FIG. 4 illustrates, in block diagram form, the RF circuit of the smartcard of FIG. 1.

FIG. 4 illustrates in block diagram form additional details of RF circuit 116. RF circuit controller 404 operates under control of computer 113 via bus 120. Together, computer 113 and RF circuit controller 404 perform the standard pager functions that are well known in the art. U.S. Pat. No. 5,311,570 discloses these standard functions for a pager controller. The functions of elements 401, 402, and 403 are well known in the art.

Figure 5:
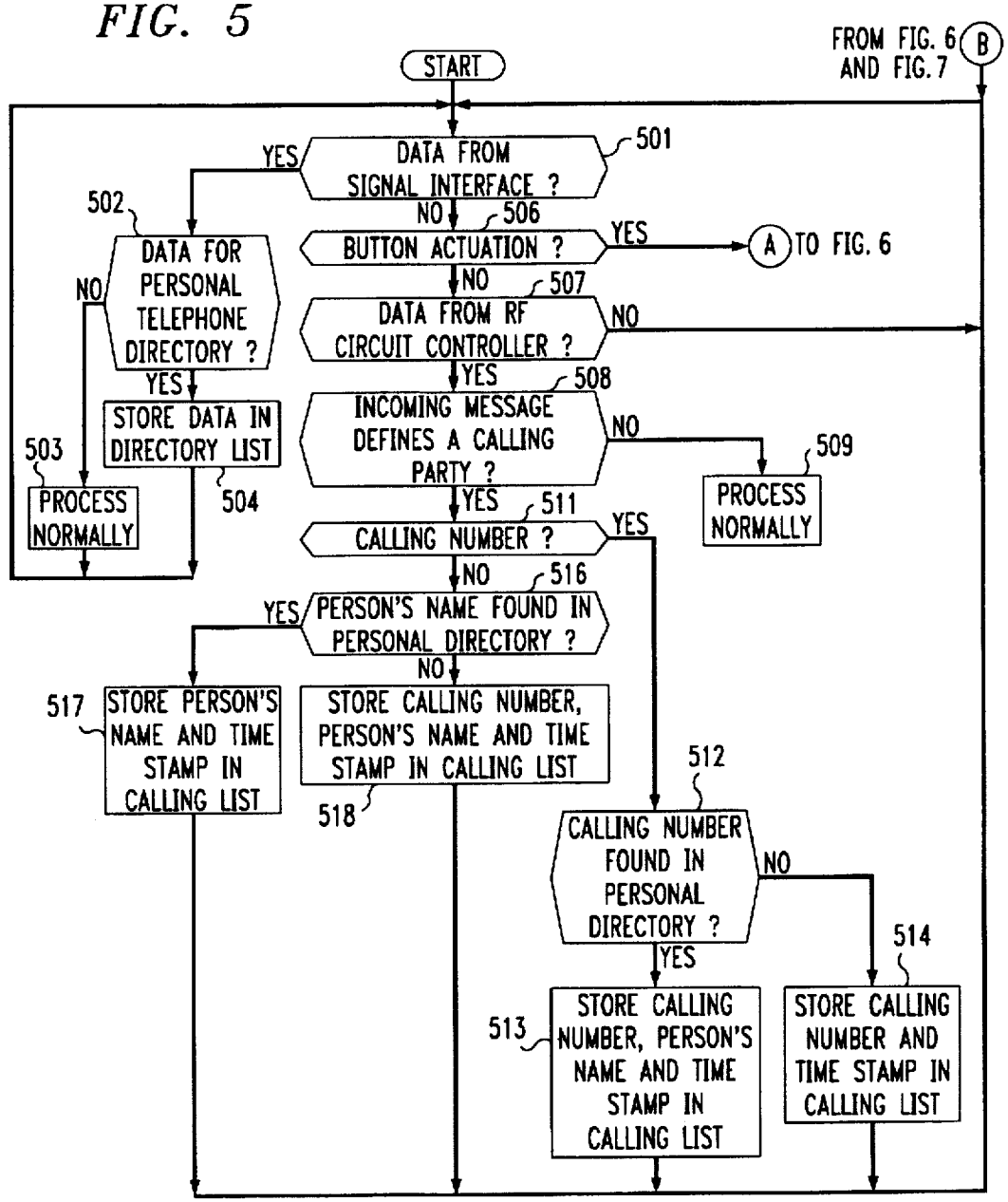
FIGS. 5 through 8 illustrate, in flow chart form, the operations performed by the computer of the smartcard illustrated in FIG. 1.
Figure 6:
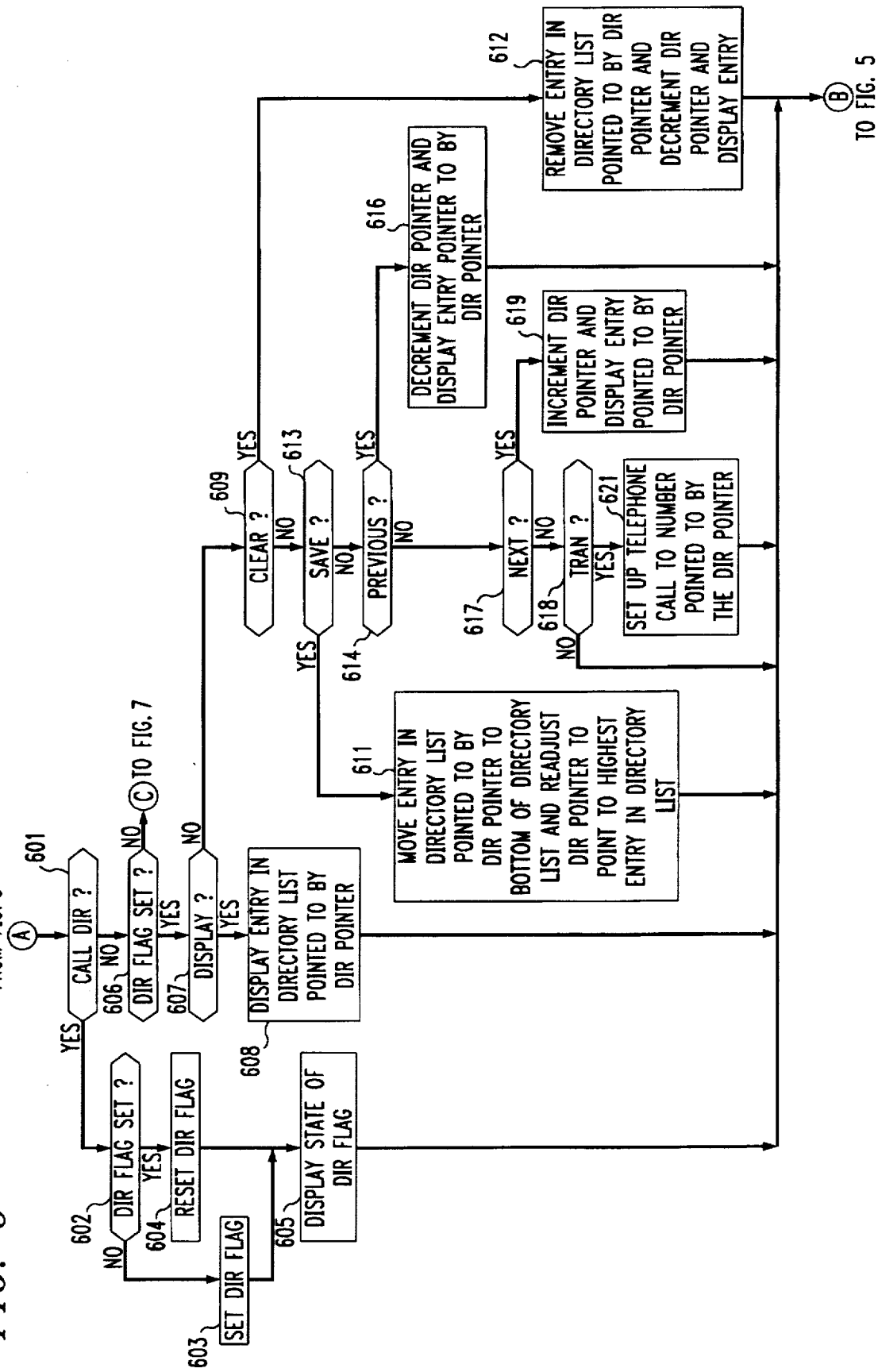
Figure 7:
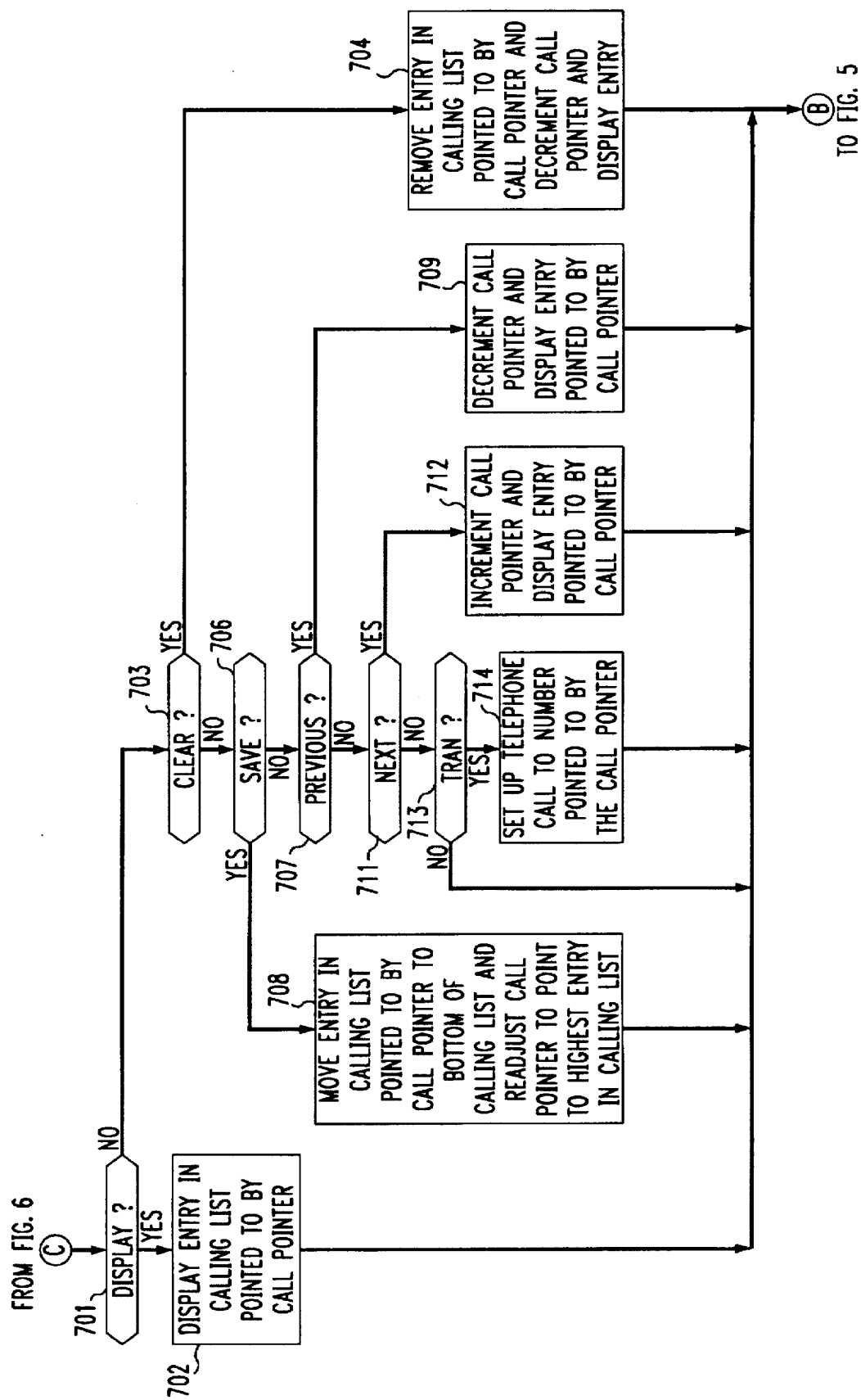

FIGS. 5-7 illustrate, in flow chart form, the operations performed by computer 113. With respect to FIG. 5, decision block 501 determines if the data is from the signal interface i.e., data from personal computer 340. If the answer is yes, control is transferred to decision block 502 which determines if the data is information that is to be used for updating the personal telephone directory stored in memory 114. If the answer is yes, the data is stored in the directory list in memory 114 by block 504. If the answer is no, control is transferred to block 503 which processes the data in a normal manner.

Returning to decision block 501, if the answer is no, control is transferred to decision block 506 which determines if one of the buttons 101–108 was actuated. If the answer is yes, control is transferred to FIG. 6 by connector A.

If the answer is no in decision block 506, control is transferred to decision block 507 which determines if the data is from RF circuit controller 404 of FIG. 4. If the answer is no, control is transferred back to decision block 501. If the answer is yes, control is transferred to decision block 508 which determines if the incoming message defines the fact that a calling party has left a page message for this particular pager at the page center. If the answer is no, control is transferred to block 509 which processes the message in a normal manner. If the answer is yes, control is transferred to block 511 which determines if the message contains a calling number or textual information defining the name of the individual who left the message at the paging center. If the answer is that telephone number is received, control is transferred to decision block 512 which examines the personal directory to determine if the calling number is found within the directory. This is done in order to obtain the name of the caller. If the answer in decision block 512 is no, control is transferred to block 514 which stores the calling number and the time stamp in the calling list maintained in memory 114. If the answer is yes, the accessed calling number, the caller's name, and the time list are stored in the calling list. After the operations of blocks 513 and 514, control is transferred back to decision block 501.

Returning to decision block 511, if the answer is no, control is transferred to decision block 516 which accesses the personal directory stored in memory 114 to find the caller's name. If the name is found, control is transferred to block 518 which stores the calling number, the person's name, and the time stamp in the calling list stored in memory 114. If the answer is no, control is transferred to block 517 which stores the person's name and the time stamp in the calling list maintained in memory 114. After the execution of blocks 517 and 518, control is transferred back to decision block 501.

Returning to decision block 506, if a button has been actuated, control is transferred to decision block 601 of FIG. 6 via connector A. Computer 113 maintains a DIR FLAG to define whether computer 113 is utilizing the directory list or the calling list. Decision block 601 determines whether the CALL DIR button has been actuated. If the answer is yes, control is transferred to 602 to determine whether the DIR FLAG is set or not. If the DIR FLAG is reset, block 603 sets the DIR FLAG. If the DIR FLAG is set, block 604 resets the DIR FLAG. Control from either block 603 or 604 is transferred to block 605 which displays the state of the DIR FLAG for a predefined period of time on display 109. After execution of block 605, control is transferred back to decision block 501 of FIG. 5 via connector B.

Returning to decision block 601, if the answer is no, control is transferred to decision block 606 which determines if the DIR FLAG is set. If the answer is no, control is transferred to decision block 701 of FIG. 7 via connector C. If the answer is yes, control is transferred to decision block 607 which determines if display button 103 was actuated. If the answer is yes, control is transferred to block 608 which displays the entry in the directory list pointed to by the DIR pointer.

Returning to decision block 607, if the answer is no, control is transferred to decision block 609 which checks if the CLR button 102 was actuated. If the answer is yes, control is transferred to block 612 which removes the entry in the directory list pointed to by the DIR pointer, decrements the directory pointer, and displays the entry now pointed to by the DIR pointer.

Returning to decision block 609, if the answer is no, control is transferred to decision block 613 which checks if SAVE button 104 was actuated. If the answer is yes, control is transferred to block 611. The latter block moves the entry in the directory list pointed to by the DIR pointer to the bottom of the directory list and readjusts the DIR pointer to point to the highest entry in the directory list. If the answer to decision block 613 is no, control is transferred to decision block 614.

Decision block 614 checks if PREV button 105 was actuated. If the answer is yes, control is transferred to block 616 which decrements the DIR pointer and displays the entry now pointed to by the DIR pointer. If the answer in decision block 614 is no, control is transferred to decision block 617.

Decision block 617 checks if the NEXT button 106 was actuated. If the answer is yes, control is transferred to block 619 which increments the DIR pointer and displays the entry now pointed to by the DIR pointer. If the answer in decision block 617 is no, control is transferred to decision block 618 which checks if the TRAN button 108 was actuated. If the answer is yes, control is transferred to block 621. Block 621 sets up a telephone call to the telephone number presently pointed to by the DIR pointer. The user only actuates TRAN button 108 when smartcard 100 was inserted into a reader attached to a telephone.

Returning to decision block 606, if the answer is no, control is transferred to decision block 701 of FIG. 7. Blocks 701 through 714 perform the same operations as blocks 607 through 621 with the exception that the CALL pointer and the calling list are used rather than the DIR pointer and the directory list, respectively.

Figure 8:
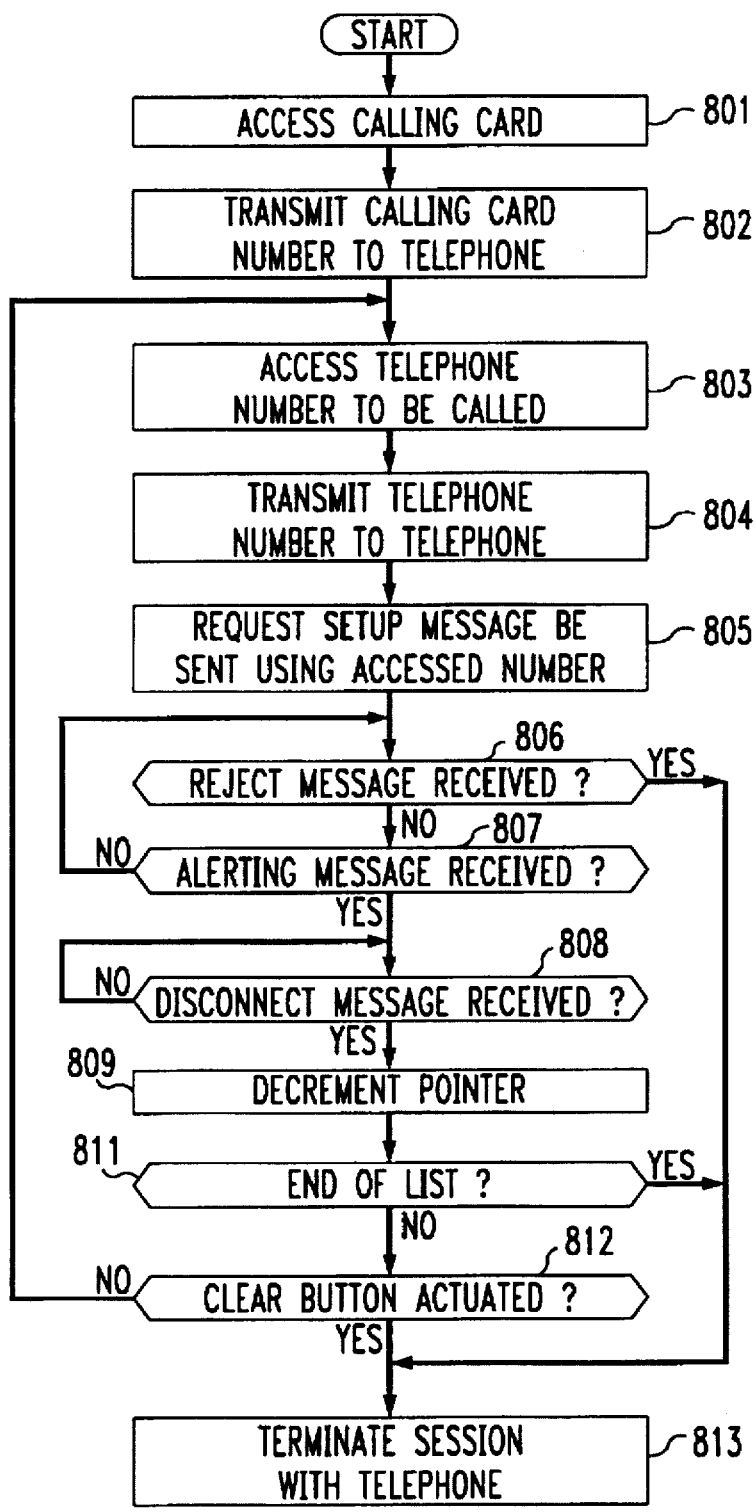

FIG. 8 illustrates the operations performed by computer 113 in placing calls using either the directory list or the calling list. Computer 113 communicates with a telephone set via signal interface 111. Smartcard 100 is placed in the smartcard reader associated with the telephone set with the proper list having been already selected and the initial telephone number to be dialed being displayed in display 109. This telephone set is described in the previously incorporated patent application. To start the operation, the user then actuates TRAN button 108. Computer 113 is responsive to the actuation of button 108 to execute block 801 which accesses the calling card number to be utilized to pay for the call. Next, block 802 transmits the calling card number to the telephone. Block 803 accesses the telephone number to be called utilizing the proper pointer, and block 804 transmits the accessed telephone number to the telephone. Block 805 requests that a set up message be sent by the telephone using the accessed telephone number. Decision block tests to see if a reject message has been received from the called telephone. If the answer is yes, control is transferred to block 813 which terminates the session with the telephone. If the answer is no, control is transferred to block 807 which determines if an alerting message has been received from the called telephone. If the answer is no, control is transferred back to 806. When the answer is yes, control is transferred to block 808 which awaits the receipt of a disconnect message from the called telehone or the telephone system through which the call had been placed. Once, a disconnect message has been received, control is transferred to block 809 which decrements the pointer. Decision block 811 determines if the last number of the list has been called. If the answer is yes, block 813 is executed to terminate the session. If the answer is no, control is transferred to block 812 which determines if the CLR button 102 was actuated at any time during the call to the previous telephone number. If the answer is yes, control is transferred to block 813. If the answer is no, decision block 812 transfers control to block 803 so that the next telephone number in the list can be called.

Figure 9:
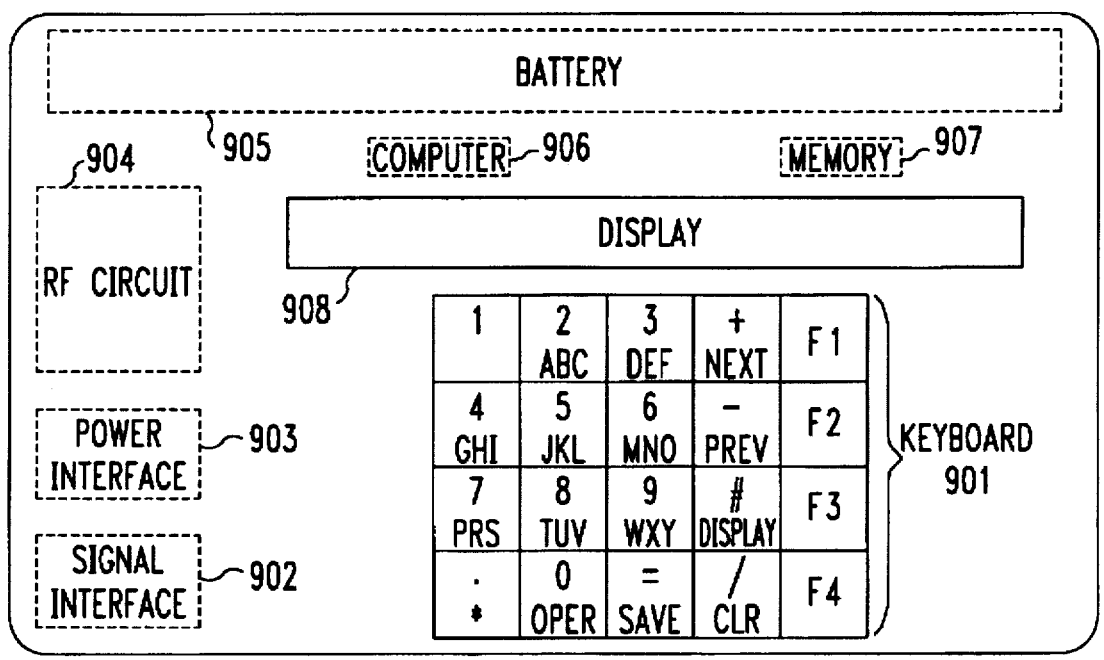
FIG. 9 illustrates a pictorial view of a second embodiment of a smartcard which is the subject of this invention.

FIG. 9 illustrates a second embodiment of the invention. The card illustrated in FIG. 9 has the same functions as card 100 of FIG. 1 but in addition, can be utilized as a calculator and has the capability for the user to enter names and telephone numbers utilizing keyboard 901. With respect to the functions that are identical to those performed by the card 100, key F1 of keyboard 901 performs the same functions as CALL DIR button 101, key F4 performs the same functions as TRAN button 108, the functions of buttons 102 through 106 of card 100 as illustrated in FIG. 1 are performed by the keys of keyboard 901 as indicated by the legend on those keys. For example, the "+" performs the function of NEXT in conjunction with key F1 being actuated. To utilize the card illustrated in FIG. 9 as a calculator, the F3 key is actuated.

To enter telephone numbers and names into the directory list that is maintained by computer 906 in memory 907, the user would first actuate key F2 and use the numerical keys on keyboard 901. For example, to enter the telephone number and the name "Mom", the user would first actuate F2 and then enter the telephone number utilizing the numerical keys of keyboard 901. As the user enters the telephone number utilizing the numerical keys on keyboard 908, computer 906 displays these numbers on display 908. To enter the word "Mom", after entering her telephone number, the user actuates the "." key which informs computer 906 that the numerical keys are going to be utilized to enter letters that are indicated under each number on the numerical keys of keyboard 901. To enter "Mom", the user first actuates the "6" key once. That causes the letter "M" to appear in display 908. Next, the user actuates the "." key which indicates that another letter is going to be entered, and actuates the "6" key three times which causes the letter "O" to be displayed in display 908. The user actuates the "." key again and then actuates the "6" key once which causes the letter "M" to be displayed in display 908. At this point, the telephone number and the word "Mom" are displayed in display 908. If everything is correct, the user actuates the "SAVE" key. If the display is not correct, the user actuates the "CLR" key which clears the display and the user restarts by entering the telehone number. The user can utilize keyboard 908 to remove telephone numbers and names which are in the directory list by actuating the F2 key and using the "PREV" key and the "CLR" key to remove these items.

It is to be understood that the above-described embodiments are merely illustrative of principles of the invention and that other arrangements may be devised by those skilled in the art without departing from the spirit or scope of the invention.

APPENDIX A

SMARTCARD TELEPHONE ADJUNCT

Technical Field

This invention relates to smartcards and, more particularly, to smartcard readers in a communication environment.

Background of the Invention

A smartcard is a card that contains a microprocessor, memory, input/output capability and a power system. Typical smartcards are credit-card sized and are compatible with the ISO credit card standards.

Smartcards come in different varieties but, primarily, they are distinguished by whether or not they contain accessible electrical contacts. However, regardless of whether the smartcard has contacts or is contactless, current art requires the use of smartcard readers. A smartcard reader contains apparatus and circuitry for supplying power to the circuitry within the smartcard and circuitry for communicating digital information to, and from, the smartcard.

Typically, smartcard readers are physically connected to, and intimately associated with, a service providing apparatus. One example is a computer. A user seeking access to the computer has the user's smartcard read by the smartcard reader and information derived from the smartcard is analyzed. The analysis is basically a security check. When the computer determines that the user is authorized, access is granted to the computer's resources. This is an illustration of smartcard use where the smartcard provides an identification.

Another application of smartcards is to provide a value, such as a dollar amount. The card is read by a smartcard reader that is coupled to a computing means in association with a service-providing device; and with each use the dollar amount associated with the card is decremented. This is akin to the magnetic mass transit ticket found, for example, in the Washington, D.C., subway system. A similar use is found in Europe where the smartcard reader is associated with a telephone, the value that is stored in the smartcard is "time" and the telephone apparatus includes means for measuring call durations and decrementing the amount of "time" left on the smartcard.

In none of the prior art applications is there a card reader that includes means for interacting with both a telephone and remote apparatus that is accessed via the telephone network.

Summary of the Invention

Substantial benefits are attained for users of the telecommunications network through a telephone adjunct, or a telephone which incorporates the telephone adjunct, that includes a smartcard reader. One basic concept incorporated in this invention is the ability of smartcards to interact with a service provider called by the user. One salient feature of this invention is that the user can interact with the service provider in the normal mode (e.g., through voice communication) and then switch over to digital communication between the smartcard and the service provider. Normal mode operation can be reinstated upon termination of the digital communication by the smartcard.

In one embodiment, the adjunct contains the smartcard reader coupled to a modem and the modem is coupled to a network port of the adjunct through a switch. The user's telephone is coupled to the network port of the adjunct through the same switch. The switch is under influence of a controller that is sensitive to selected control signals, such as voice energy from the user's telephone, voice or carrier frequency from the network and carrier or data signals from the modem.

Brief Description of the Drawing

Figure 10:
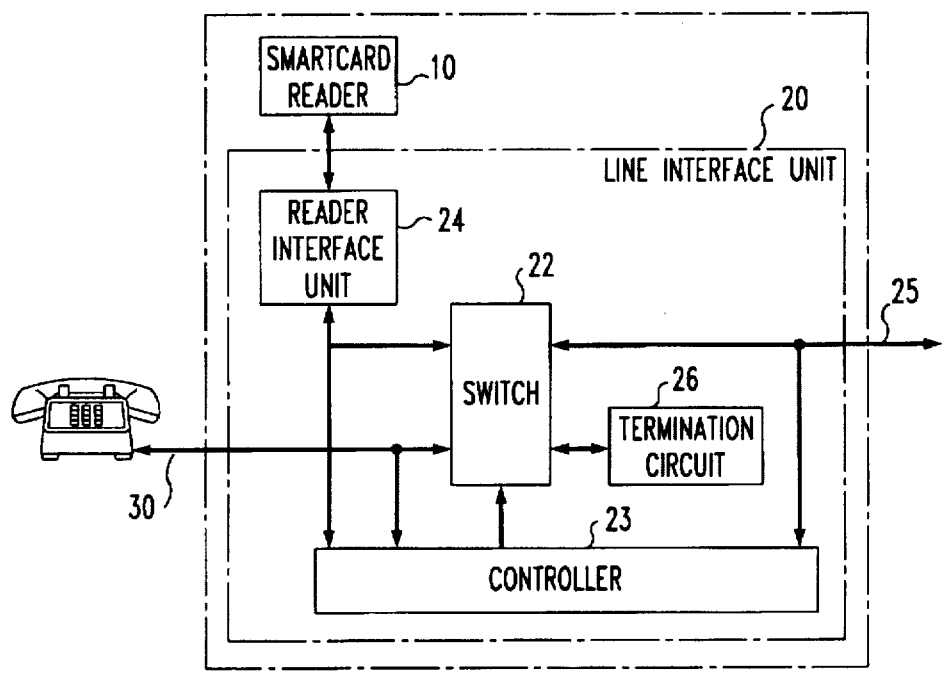
FIG. 10 presents a block diagram of a telephone-smartcard reader adjunct as described in Appendix A.
Figure 11:
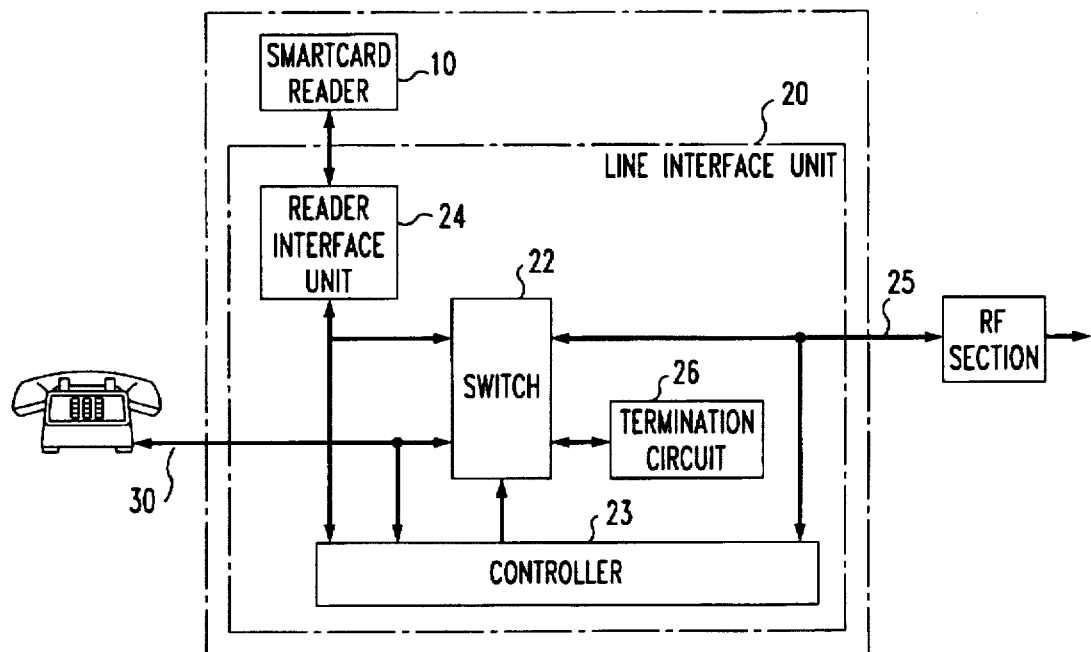
FIG. 11 depicts the adjunct of FIG. 10 with an RF module connected thereto to create a wireless apparatus, as described in Appendix A.
Figure 12:
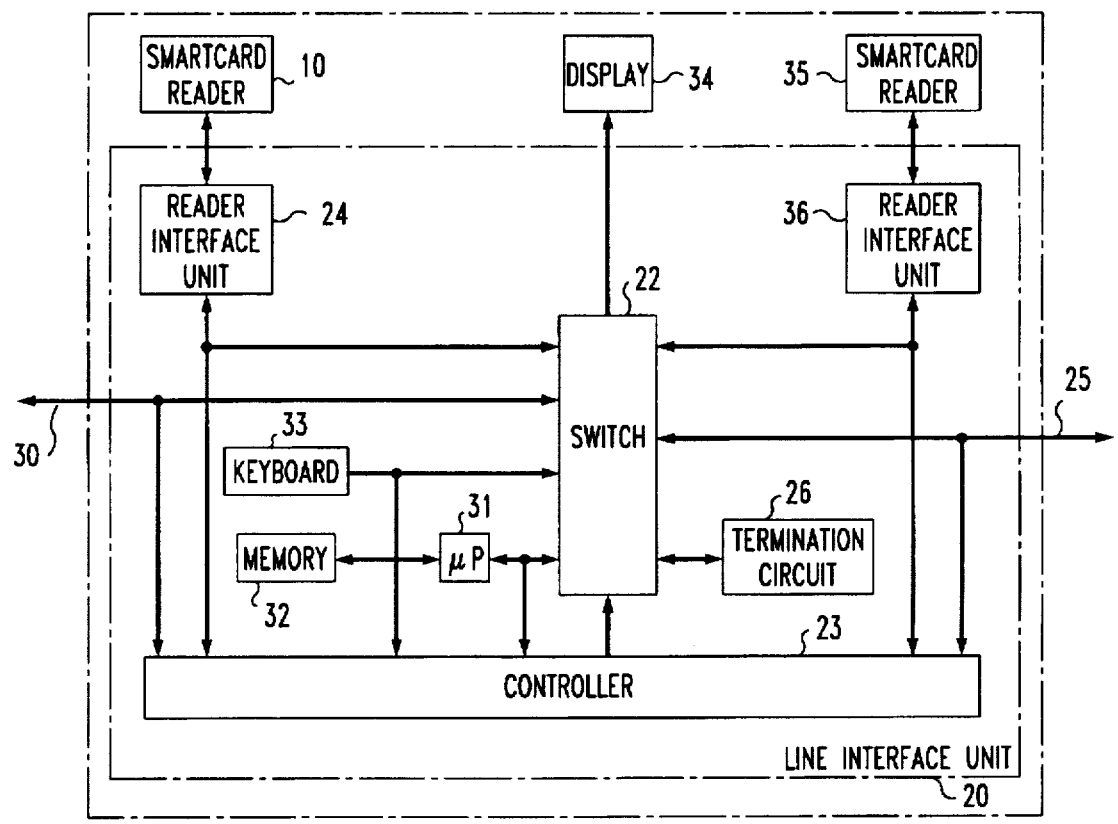
FIG. 12 presents another embodiment of a telephone-smartcard reader adjunct in accordance with the principles of the invention, and described in Appendix A.
Figure 13:
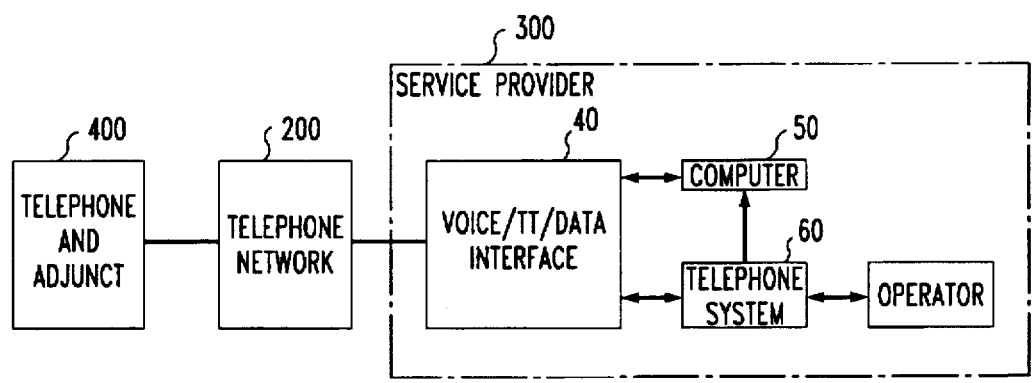
FIG. 13 depicts an arrangement that connects the telephone and adjunct combination, through the telephone network to a service provider, as described in Appendix A.

FIG. 10 presents a block diagram of a telephone-smartcard reader adjunct;

FIG. 11 depicts the adjunct of FIG. 10 with an RF module connected thereto to create a wireless apparatus;

FIG. 12 presents another embodiment of a telephone-smartcard reader adjunct in accordance with the principles of this invention; and FIG. 13 depicts an arrangement that connects the telephone and adjunct combination, through the telephone network to a service provider.

Detailed Description

FIG. 10 describes one embodiment of an apparatus employing the principles of this invention. It comprises smartcard reader 10 and a line interface unit 20. Unit 20 is connected to smartcard reader 10 and to ports 25 and 30. Port 25 is adapted for connection to the telephone network, and port 30 is adapted for connection to a telephone instrument or the like (e.g., a modem).

Smartcard reader 10 is a conventional smartcard reader, not unlike the smartcard reader sold by AT&T under the name "AT&T Smartcard Reader - 5B". This device contains mechanical means for coupling a smartcard to the reader, and electronic circuitry. The latter includes circuitry for coupling power to the smartcard reader and circuitry for communicating digital information to and from the smartcard. The above-referenced reader also includes a microprocessor but, for purposes of this invention, the microprocessor is not required. It may be beneficial (though also not required) to purchase the AT&T smartcard reader hardware development kit.

The principles of this invention are applicable to both analog and digital environments of the telephone network. For illustrative purposes, the FIG. 10 apparatus is first described for a digital environment and then described for an analog environment. Thereafter, the description proceeds solely in the analog environment,
5   but it is to be understood that a digital environment is within the contemplation of this invention.

For digital use, port 25 may be adapted to work in a digital telephone network such as the ISDN network, where signals may flow in frames of 128 bits that contain 16 control bits. In a typical application, port 30 would also be adapted
10  to work digitally and the telephone instrument connected to port 30 would be one that is adapted to receive such 128 bit frames. Of course, that is not a requirement, since the FIG. 10 apparatus can contain a translating means for whatever telephone instrument is, in fact, connected to port 30. Such a translating means is not explicitly depicted in FIG. 10, but its electrical positioning is quite clear, i.e.,
15  interposed between ports 25 and 30. It is also quite clear that reader 10 must include means that can interact digitally in the 128-bit frame format. Such means, which is often called a "digital signal unit" merely buffers information and includes means for identifying the 16 control bits. Such units are well known in the art and do not, *per se*, form a part of this invention. The digital signal unit may be included within
20  reader 10, as suggested above, but it can also be included in the line interface unit (20) itself.

When signals flowing between smartcard reader 10 and port 25 are strictly digital (i.e., dc levels that represent 1's and 0's, as contrasted to modulated analog signals that carry digital information), means must be provided to disallow
25  port signals 25 from commingling and thereby interfering with the communication between reader 10 and port 25. Accordingly, in such a digital environment, line interface unit 20 must include at least a switch, such as switch 22, that establishes communication either between port 25 and reader 10 or between port 25 and port 30. The digital signal unit described above is embodied within reader interface unit 24
30  and is, thus, a part of the line interface unit and interposed between reader 10 and switch 22.

Control of switch 22 is effected via signaling on ports 25 and 30, and/or reader 10. More specifically, controller 23 is responsive to the signals arriving from ports 25 and 30, and arriving from reader interface unit 24. The state of switch 22 is
35  dictated by the control signals detected by controller 23 from reader 10 and from ports 25 and 30.

In an analog environment, the primary signal conversion need is the need to convert the digital signals developed by the card reader into analog form and, conversely, to convert analog signals destined to the reader into digital format. That, of course, is the modem function. Accordingly, in an analog environment, reader interface unit 24 is merely a conventional modem. Also, in an analog environment, switch 22 is not required for proper operation of the FIG. 10 apparatus because low level analog noise signals emanating from port 30 can be ignored in a properly designed reader 10. That is, in a "poor man" embodiment of this invention it is possible to do without switch 22, and merely instruct the user to not speak during data transmission to and from reader 10. Of course, it is beneficial to include a switch 22 and a switch controller 23 so that the signals of port 30 can be blocks when appropriate.

In operation, reader 10 communicates data and control information in a full duplex mode from the smartcard to the modem (24), and vice versa. The modem communicates information from the smartcard reader to switch 22, and vice versa. The line interface unit communicates data information between reader 10 and port 25, or communicates user signals (e.g., voice) between port 25 and port 30.

Switch 22 effects this function under influence of controller 23. Controller 23 may be connected to port 25, to reader 10, to port 30, or to any combination of the above, as chosen by a designer. The FIG. 10 embodiment shows a connection of all three (ports 25 and 30 and reader 10) to controller 23. Controller 23 can control switch 22 in myriad ways. One way, for example, is to give ultimate control to port 30. The user, who is connected to the FIG. 10 apparatus via a telephone coupled to port 30, can then have ultimate control over the operation of the FIG. 10 apparatus. Such control is effected, for example, through the touch-tone pad at the user's telephone instrument. Alternatively, ultimate control can be given to port 25, so that whenever the apparatus that is connected to port 25 via the telephone network wishes to request digital information from reader 10, or to send digital information to reader 10, it can do so regardless of whether or not the user is engaged in a conversation with the called party (or with a nearby listener who is not really part of the telephone connection). Ultimate control can be granted to port 25 simply by including a means, connected to port 25, for detecting a carrier signal. Such means may comprise conventional circuits for "carrier detect", which are found in all dial modems. When a carrier is detected, the connection between ports 25 and 30 is disabled, and the telephone at port 30 is effectively muted. Of course, control can also be established by the signals arriving from reader 10, in a manner not unlike the manner control is granted to port 25. In the context of the above, ultimate control by a port means that the port can relinquish control to other ports, or signals, but, at any time, that port can reassert control.

It may be noted that whereas switch 22 is depicted above as a single pole-double throw switch that connects port 25 to either port 30 or to reader 10, that need not be the case. It is very easy to employ a switch 22 that also permits port 30 to be connected to reader 10, or even a slightly more complex switch that connects port 25 to a "hold" circuit 25 when port 30 is connected to reader 10. That is, the user may desire to connect the port 30 telephone instrument to reader 10, and then establish a connection with the telephone network at port 25, or the user may desire to connect the port 30 instrument to reader 10 at some time after the connection with the telephone network. In the former case, port 25 can be left idle, whereas in the latter case port 25 must be terminated properly if the connection to the telephone network is not to be dropped. To that end, FIG. 10 shows terminating circuit 26 connected to switch 22.

The above presentation disclosed various ways in which ports 25 and 30, and reader 10 can have ultimate control over the state of switch 22 (via controller 23). It should be understood, however, that such control does not have to be constant or overarching and, indeed, it is quite possible to design controller 23 so that no port has "ultimate" control. Simply stated, controller 23 can be a conventional "state machine" that is responsive to all of its inputs and that is also sensitive to past inputs.

It is interesting to note that the combination realized with a conventional telephone coupled to the FIG. 10 adjunct results, effectively, is a very "smart" phone, because the smartcard imparts all of its capabilities to the combination. Many advantages can result from such a combination, including, for example, a very beneficial wireless phone (e.g., a cellular phone). All that is required to create a wireless phone is an rf receiver and transmitter section that is coupled to port 25. This is depicted in FIG. 11. The advantage of the FIG. 11 wireless phone is that all personalized information is contained in the smartcard, and not in the phone. That means that a user can pick-up any telephone arrangement that includes the adjuncts (of course, the functions of a conventional telephone can be incorporated in the FIG. 10 apparatus, yielding a phone with a smartcard reader) and convert it to uniquely personal cellular telephone simply by inserting the user's smartcard into it. This benefit, by the way, accrues to the FIG. 10 arrangements as well.

To further enhance operation of the FIG. 10 apparatus, it is useful to include a display means. The intent is to display some of the information that is entered into, or that is delivered, by reader 10. To that end, a display may be connected to switch 22 to allow data that flows to and from reader 22 to be captured at appropriate times and be displayed.

To still further enhance operation of the FIG. 10 apparatus, a microcomputer can be incorporated in the arrangement to perform various "smart phone" functions. The microcomputer, comprising a microprocessor and associated memory, may advantageously also be connected to switch 22. One such function may be "speed calling", where directory data is stored in the microprocessor's memory and that data is accessed via an application program that is initiated by the telephone instrument. Another application may be a set of services, such as call forwarding, distinctive ringing, three way calling, etc.

Yet another enhancement to the operation of the FIG. 10 apparatus is attained by including a keyboard. A conventional touch-tone telephone provides limited capability for the user to supply character information to either reader 10 or to port 25. In some applications it may be very useful to include a keyboard, and that keyboard may constitute a secondary input means, over and above the user's touch-tone pad. It would be advantageous to connect the keyboard to switch 22 to allow connection flexibility (though not a must).

In some anticipated applications of smartcards, a user will be requesting service from a representative of a service provider. The service provider may wish to authenticate not only the user but also the identity of the representative (such as when the representative is a traveling salesperson). To that end, it may be useful to have an adjunct that includes two smartcard readers. With two readers, it is possible to arrange for the service to be provided only when the information read from both readers is correct. The second reader may be incorporated into the structure of the adjunct, or it may be connected through, a separate port, in the same manner that reader 10 is connected to the line interface unit of FIG. 10.

An arrangement that includes all of the above enhancements is depicted in FIG. 12. It should be understood, of course, that any particular embodiment employing the principles of this invention need not use all of those enhancements. Any combination can be employed.

In FIG. 12, microprocessor 31 is connected to switch 22 and to ports 25 and 30. Memory 32 is connected to microprocessor 31. Keyboard 33 is connected to switch 22, display means 34 is connected to switch 22, and reader 35 is connected to switch 22 via reader interface unit 36. All of those elements are also connected to controller 23, allowing switch 22 to effect whatever connection patterns the designer wishes to implement.

Switch 22 for the FIG. 12 embodiments can be an electronic crossbar switch, but it doesn't need to be a "full access" switch because certain connections are not likely to be ever used. For example, no element other than port 25 will ever be connected to termination circuit 26.

One application of this invention is a means for interfacing remotely with a service provider. Such an arrangement is depicted in FIG. 13, where the telephone adjunct arrangement described in connection with FIGS. 10-12 is represented by block 400. Block 400 is connected through telephone network 200 to service provider 300. Service provider 300 comprises a voice/touch-tone/data interface unit 40 which is interposed between telephone network 200 and elements 50 and 60. Element 50 is a conventional computer and element 60 is a telephone system, such as a PBX or an Automatic Call Distributor (ACD), that is able to communicate with interface 40 and computer 50.

Voice/touch-tone/data interface 40 is a system for accepting information from network 200 in either of the three formats (voice, touch-tone signals, or data signals) and is robust enough to interpret those signals and pass them along to either computer 50 or telephone system 60, as the information content of the signals requires. Such capability is found in the AT&T CONVERSANT® (registered trademark of AT&T) Voice Information System.

Basically, interface 40 may simply comprise a router. It accepts signals in one of the three formats and directs those signals to the appropriate outputs based on specified criteria. For example, in its simplest form, interface 40 may include circuitry that differentiates between voice signals, modem signal data and touch-tone data. Such a capability is easily achievable with conventional circuitry. The circuitry must only be sensitive to whether the signal is touch-tone or a modulated modem signal. All such circuits are available in the industry. Signals which are neither touch-tone nor modem can be concluded to be voice signals.

Having decided that the signal is a modem data signal, subsequent conventional circuitry can develop the digital signal contained therein and apply it to computer 50. Similarly, having determined that the signal is a voice signal, the routing circuitry can direct the signal to telephone system 60. With touch-tone data, the router can capture the signal, decode it, determine from the contents of the signal whether it is intended for computer 50 or telephone system 60, and route it accordingly.

Telephone system 60, as indicated above, can be an ACD, which in turn is connected to service agents.

In operation, communication may arrive from element 400 via touch-tone and voice signals, and connected to telephone system 60. The service agents connected to system 60 can then converse with the user coupled to element 400 and ascertain the desired service. Having so ascertained, the service agent can control computer 50 to begin an application program and also control element 400 through appropriate signals sent by system 60 through interface 40 and network 200 to element 400.

It is also possible for element 400 to access service provider 300 and be routed directly to computer 50. There the application program is initiated by actions of the user coupled to element 400.

The AT&T CONVERSANT® Voice Information System equipped with ASR (Automatic Speech Recognition) and T-T-S (Text-to-Speech) is also capable of creating computer generated voice responses. Some such systems create the voice responses that correspond to pre-recorded messages and others generated voice from text, "on-the-fly".

Also, the CONVERSANT® Voice Information System equipped with ASR (Automatic Speech Recognition) and T-T-S (Text-to-Speech) has the ability to recognize speech by recognizing certain words in the stream of spoken words and respond accordingly. These capabilities are beneficial to the system provider of FIG. 13 but, as indicated above, they are not necessary to the principles of this invention as depicted in FIG. 13.

I claim:

1. A smartcard for receiving pages and returning telephone calls, comprising:
   a keyboard for receiving user information;
   a memory;
   a pager for receiving paging information;
   controller for storing the paging information in the memory;
   smartcard interface for connecting to a telephone and for receiving telephone information from the telephone;
   the controller responsive to user information for transmitting billing information to the telephone; and
   the controller further responsive to the telephone information, user information, and the stored paging information for placing telephone calls.

2. The smartcard of claim 1 wherein the paging information can be telephone numbers or names and the controller responses to the names in the paging information for determining telephone numbers from directory information stored in the memory and responses to the telephone numbers of the paging information for determining telephone numbers from the stored directory information.

3. The smartcard of claim 2 wherein the directory information is transmitted by a computer via an attached smartcard unit to the controller via the smartcard interface, and the controller stores the directory information in the memory.

4. The smartcard of claim 3 further comprises a battery and a power interface, and the smartcard unit comprises a power transfer circuit for charging the battery via the power interface.

5. The smartcard of claim 2 further comprises a display, and the user enters the directory information using the keyboard, the controller, and the display.

6. The smartcard of claim 5 further adapted for performing user calculations by using the display, keyboard, and the controller.

7. The smartcard of claim 2 further adapted for allowing the user to determine the order in which telephone calls are returned using the display, keyboard, and controller to arrange the paging information.

8. A method for receiving pages and returning telephone calls by controlling a smartcard comprising a keyboard, pager, controller, memory and smartcard interface, the method comprising the steps of:
   receiving user information from the keyboard;
   receiving paging information from the pager;
   storing the paging information by the controller in the memory;
   connecting to a telephone and receiving telephone information from the telephone by the smartcard interface;
   transmitting billing information via the smartcard interface to the telephone by the controller in response to user information; and
   placing telephone calls via the smartcard interface by the controller further in response to the telephone information, user information, and the stored paging information.

9. The method of claim 8 wherein the paging information can be telephone numbers or names and determining telephone numbers from stored directory information by the controller in response to the names of the paging information and determining telephone numbers from the stored directory information by the controller in response to the telephone numbers of the paging information.

10. The method of claim 9 further comprises the step of transferring the directory information to the controller via the smartcard interface by a computer via an attached smartcard interface unit.

11. The method of claim 10 wherein the smartcard further comprises a battery and a power interface and the method further comprises the step of charging the battery via the power interface by the smartcard unit using a power transfer circuit.

12. The method of claim 9 wherein the smartcard further comprises a display and the method further comprises the step of entering the directory information by the user via the keyboard, the controller, and the display.

13. The method of claim 12 further comprises the step of performing user calculations by using the display, keyboard, and the controller.

14. The method of claim 9 further comprises the step of allowing the user to determine the order in which telephone calls are returned via the display, keyboard, and controller to arrange the paging information.

* * * * *